US008571935B2

(12) United States Patent
Geer, III et al.

(10) Patent No.: US 8,571,935 B2
(45) Date of Patent: *Oct. 29, 2013

(54) DYNAMIC INTEGRATION AND LINEAR PRESENTATION OF ADVERTISING CONTENT AND MEDIA CONTENT

(75) Inventors: Walter Geer, III, Bronx, NY (US); Ellen To, New York, NY (US); Suzanne McDonnell, New York, NY (US); Adam Solomon, East Setauket, NY (US); Mark Fortner, New York, NY (US); Jason Witt, South Orange, NJ (US)

(73) Assignee: Viacom International Inc., New York, NY (US)

( * ) Notice: Subject to any disclaimer, the term of this patent is extended or adjusted under 35 U.S.C. 154(b) by 403 days.

This patent is subject to a terminal disclaimer.

(21) Appl. No.: 12/794,337

(22) Filed: Jun. 4, 2010
(Under 37 CFR 1.47)

(65) Prior Publication Data
US 2011/0112914 A1    May 12, 2011

Related U.S. Application Data

(60) Provisional application No. 61/184,274, filed on Jun. 4, 2009.

(51) Int. Cl.
*G06Q 30/00* (2012.01)
*G06F 15/16* (2006.01)
*H04N 7/025* (2006.01)
*H04N 5/445* (2011.01)

(52) U.S. Cl.
USPC .......... 705/14.61; 705/14.49; 725/34; 726/29

(58) Field of Classification Search
USPC .............................. 705/14.49; 725/34; 726/29
See application file for complete search history.

(56) References Cited

U.S. PATENT DOCUMENTS

| | | | |
|---|---|---|---|
| 6,912,504 B1 | 6/2005 | Rashkovskiy | 705/14 |
| 7,054,831 B2 | 5/2006 | Koenig | 705/14 |
| 7,263,714 B2 | 8/2007 | Lowthert et al. | 725/139 |
| 8,196,166 B2 * | 6/2012 | Roberts et al. | 725/34 |
| 2001/0056370 A1 | 12/2001 | Tafla | 705/14 |
| 2004/0015608 A1 | 1/2004 | Ellis et al. | 709/246 |

(Continued)

OTHER PUBLICATIONS

Office Action from co-pending U.S. Appl. No. 12/794,347, dated Aug. 16, 2012, 28 pages.

*Primary Examiner* — John G Weiss
*Assistant Examiner* — Marilyn G Macasiano
(74) *Attorney, Agent, or Firm* — Fay Kaplun & Marcin, LLP

(57) ABSTRACT

Described are methods and apparatuses, including computer program products, for dynamic integration and linear presentation of advertising content and media content. The method includes receiving a request for media content; combining the requested media content and advertising content to provide an interactive advertising unit; and transmitting the interactive advertising unit for presentation on the remote computing device, wherein the advertising content is presented before the requested media content. The interactive advertising unit includes a first content layer including the requested media content and a media player, a second content layer including the advertising content, and an integration module for coordinating interaction between the layers. Coordinating interaction between the layers includes: managing the spatial presentation of the requested media content and the advertising content, synchronizing the temporal presentation of the requested media content and the advertising content, and controlling the presentation priority of the requested media content and the advertising content.

15 Claims, 6 Drawing Sheets

(56) References Cited

U.S. PATENT DOCUMENTS

| | | | |
|---|---|---|---|
| 2004/0116183 A1 | 6/2004 | Prindle | 463/42 |
| 2004/0186771 A1 | 9/2004 | Squires | 705/14 |
| 2005/0267813 A1 | 12/2005 | Monday | 705/26 |
| 2006/0143675 A1 | 6/2006 | Willis et al. | 725/114 |
| 2006/0242016 A1 | 10/2006 | Chenard | 705/14 |
| 2007/0072676 A1 | 3/2007 | Baluja | 463/42 |
| 2007/0112630 A1 | 5/2007 | Lau et al. | 705/14 |
| 2007/0214049 A1 | 9/2007 | Postrel | |
| 2007/0260677 A1 | 11/2007 | DeMarco et al. | 709/203 |
| 2008/0021775 A1 | 1/2008 | Lerman et al. | 705/14 |
| 2008/0066107 A1 | 3/2008 | Moonka et al. | |
| 2008/0077952 A1 | 3/2008 | St. Jean et al. | 725/32 |
| 2008/0097915 A1 | 4/2008 | Golan et al. | 705/51 |
| 2008/0194332 A1 | 8/2008 | Kadikario et al. | 463/42 |
| 2008/0320512 A1 | 12/2008 | Knight | 725/32 |
| 2009/0024482 A1 | 1/2009 | Synstelien et al. | 705/14 |
| 2009/0063280 A1* | 3/2009 | Wurster et al. | 705/14 |
| 2009/0094525 A1 | 4/2009 | Coelius et al. | 715/741 |
| 2009/0265367 A1 | 10/2009 | Corbett | 707/102 |
| 2010/0153990 A1* | 6/2010 | Ress et al. | 725/34 |
| 2011/0067115 A1* | 3/2011 | Cappio et al. | 726/29 |

* cited by examiner

DYNAMIC INTEGRATION AND LINEAR PRESENTATION OF ADVERTISING CONTENT AND MEDIA CONTENT

RELATED APPLICATION

This application claims priority to Ser. No. 61/184,274, filed on Jun. 4, 2009, the entire disclosure of which is incorporated herein by reference.

TECHNICAL FIELD

The subject matter of this application relates generally to methods and apparatuses, including computer program products, for dynamic integration and linear presentation of advertising content and media content

BACKGROUND

Content providers have long sought to include advertising as part of their broadcasts in order to generate revenue and recoup the costs of content production, and manufacturers of consumer goods have placed their ads with various content providers in order to extol the virtues of their goods to the largest possible consumer audience. For example, ever since their earliest days, radio and television stations frequently have broadcast blocks of ads in between their programming segments. More recently, content providers on the Internet have utilized banner advertisements, pop-up advertisements, and other forms of interactive advertising on websites.

In order to capitalize on the recent explosion in availability of online media (e.g., streaming video feeds), content providers, consumer goods companies, and advertising firms have turned their attention to developing dynamic and interactive experiences for users who access the online media.

SUMMARY

It would be desirable to have a method and system for dynamically integrating advertising content with media content (e.g., digital media content) to achieve the effect of linking the advertisement with the context of the digital media content, web page, and/or the embedded media player, thereby increasing the advertisement's exposure to the consumer. Also, it would be desirable in some examples to completely interrupt the desired media content in a linear fashion by displaying the advertising content first, but also providing the user with a mechanism to interact with the advertising content and view the media content more quickly. Also, it would be desirable in some examples to allow the user to interact with the advertising content and/or tie the media content and the advertising content together in a unique and unanticipated way.

In general overview, the techniques described herein are related to integration of a fully interactive rich media advertising product and media content (e.g., digital media content) presented in a media player. The techniques provide for simulated integration, creating an illusion to a user that the advertising content and digital media content are brought together in the media player. The techniques also provide for functional integration via interaction between the advertising product and the media player, including manipulation of spatial, temporal, and control components, resulting in a unique presentation of the advertising content and digital media content to the user. Spatial integration refers to the synchronization of position and coverage between the advertising product and the media player. Temporal integration refers to the coordination of content display timing between the advertising product and the media player. Control integration refers to the communication between the advertising product and the media player in transferring influence and priority of displayed content. The techniques advantageously enable dynamic and unexpected interplay between digital media content contained in an embedded media player and an interactive, persistent advertising product configured to capture the attention of a user and offer an engaging, memorable experience.

The invention, in one aspect, features a method for dynamic integration and linear presentation of advertising content and media content. The method includes receiving, by a server computing device, a request for media content from a remote computing device. The method also includes combining, by the server computing device, the requested media content and advertising content to provide an interactive advertising unit. The interactive advertising unit includes a first content layer including the requested media content and a media player, a second content layer including the advertising content, and an integration module for coordinating interaction between the first and second content layers. The coordinating interaction between the first and second content layers includes one or more of managing the spatial presentation of the requested media content and the advertising content, synchronizing the temporal presentation of the requested media content and the advertising content, and controlling the presentation priority of the requested media content and the advertising content. The method also includes transmitting, by the server computing device, the interactive advertising unit for presentation on the remote computing device, wherein the advertising content is presented before the requested media content.

The invention, in another aspect, features a system for dynamic integration and linear presentation of advertising content and media content. The system includes a server computing device. The server computing device is configured to receive a request for media content from a remote computing device. The server computing device is also configured to combine the requested media content and advertising content to provide an interactive advertising unit. The interactive advertising unit includes a first content layer including the requested media content and a media player, a second content layer including the advertising content, and an integration module for coordinating interaction between the first and second content layers. The coordinating interaction between the first and second content layers includes one or more of: managing the spatial presentation of the requested media content and the advertising content; synchronizing the temporal presentation of the requested media content and the advertising content; and controlling the presentation priority of the requested media content and the advertising content. The server computing device is also configured to transmit the interactive advertising unit for presentation on the remote computing device, wherein the advertising content is presented before the requested media content.

The invention, in another aspect, features a computer program product, tangibly embodied in a computer readable storage medium, for dynamic integration and linear presentation of advertising content and media content. The computer program product includes instructions operable to configure a data processing apparatus to receive a request for media content from a remote computing device. The computer program product also includes instructions operable to configure a data processing apparatus to combine the requested media content and advertising content to provide an interactive advertising unit. The interactive advertising unit includes a first content layer including the requested media content and a media player, a second content layer including the advertising content, and an integration module for coordinating interaction between the first and second content layers, wherein the coordinating includes one or more of: managing the spatial presentation of the requested media content and the advertising content; synchronizing the temporal presentation of the requested media content and the advertising content; and controlling the presentation priority of the requested media content and the advertising content. The computer program product includes instructions operable to configure a data processing apparatus to transmit the interactive advertising unit for presentation on the remote computing device, wherein the advertising content is presented before the requested media content.

In some embodiments, any of the above aspects can include one or more of the following features. In some embodiments, the requested media content is displayed in the media player of the interactive advertising unit.

In some embodiments, managing the spatial presentation includes positioning the advertising content over the media player so as to obscure the requested media content. Managing the spatial presentation includes positioning the advertising content in proximity to the media player so as to display the requested media content unobscured.

In some embodiments, controlling the presentation priority includes instructing the media player to stop displaying the advertising content and to start displaying the requested media content.

In some embodiments, the advertising content includes a content transition application and managing the spatial presentation includes positioning the content transition application to cover at least the display window of the media player, wherein interaction with the content transition application instructs the interactive advertising unit to transition from displaying the advertising content to displaying the requested media content. Interaction with the content transition application includes receipt of user input.

In some embodiments, transitioning from displaying the advertising content to displaying the requested media content includes revealing, by the interactive advertising unit, the requested media content. The revealing occurs over a period of time. Portions of the advertising content and the requested media content are displayed simultaneously during the revealing step.

In some embodiments, the content transition application displays a graphical representation of an advertised product, an advertised service, or both.

In some embodiments, the advertising content includes an animated application and managing the spatial presentation includes positioning the animated application to cover at least the display window of the media player, wherein the interactive advertising unit displays the animated application before displaying the requested media content. The animated application displays a graphical representation of an advertised product, an advertised service, or both.

In some embodiments, the integration module is configured to transmit one or more commands from the second content layer to the first content layer, the one or more commands operable to control playback of the requested media content in the media player.

Further features and advantages of the present invention as well as the structure and operation of various embodiments of the present invention are described in detail below with reference to the accompanying drawings.

DETAILED DESCRIPTION

In general overview, the techniques described herein are directed to methods and apparatuses, including computer program products, for dynamic integration and linear presentation of advertising content and media content (e.g., digital media content). As described in more detail, the advertising content is combined with the digital media content (displayed in, for example, a media player) in a seamless fashion to provide an interactive advertising unit. The creation of the interactive advertising unit provides the advantages of greatly increasing a user's exposure to the advertising content while not materially diminishing the user's consumption of the digital media content. The nature of the interactive advertising unit, displaying advertising content in proximity to requested digital media content, allows the use of a broad range of marketing techniques, such as product placement, brand association, and click-through opportunities. Thus, the techniques provide an opportunity for manufacturers to increase the effectiveness of their advertising while maintaining the accessibility and appeal of the requested digital media content.

The display of the advertising and digital media content is not limited to a web browser or traditional embedded media player. For example, the advertising content and/or video content could be displayed to a user via an interactive application downloaded and executed on a smart phone, i.e., an "app" configured to run on the iPhone® from Apple® Computer, Inc.

Figure 1:
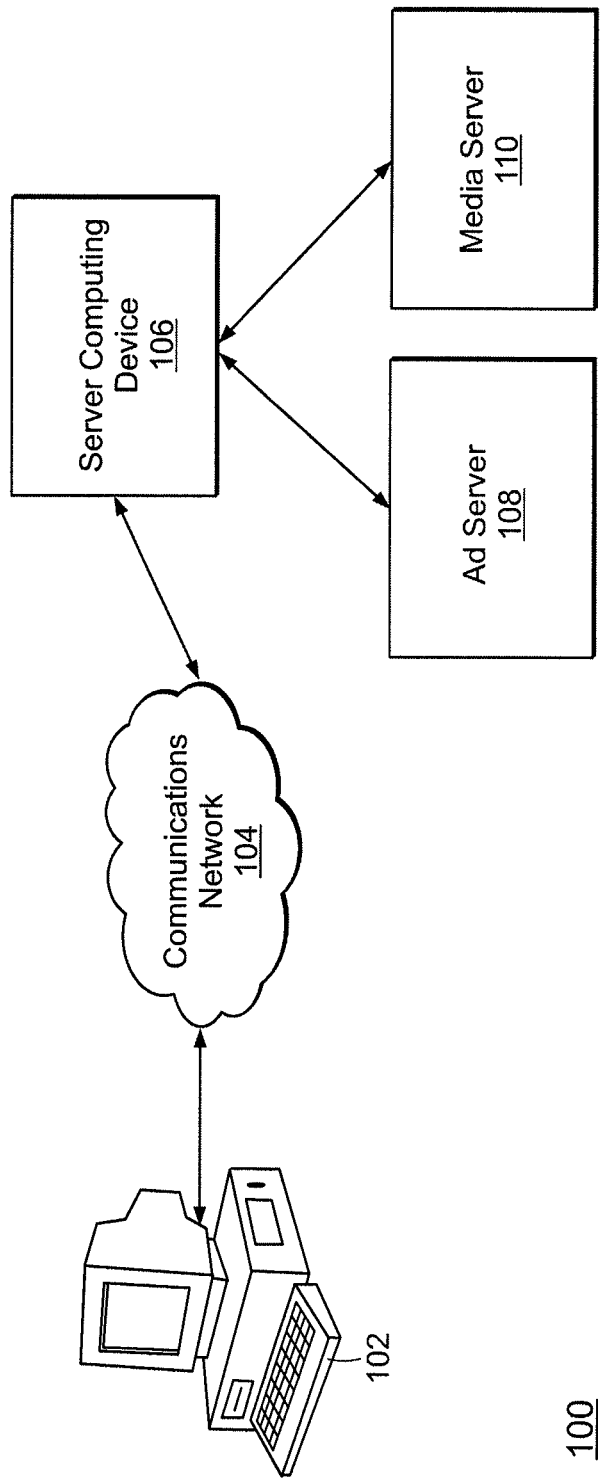
FIG. 1 is a block diagram of a system for the dynamic integration and linear presentation of advertising and media content.

FIG. 1 is a block diagram of a system 100 for dynamic integration and linear presentation of advertising and media content. The system 100 includes a client computing device 102, a communications network 104, and a server computing device 106. In some embodiments, the server computing device 106 is connected to one or more other computing devices which provide advertising content (e.g., ad server 108) and digital media content (e.g., video server 110). The server computing device 106, ad server 108, and video server 110 can reside at the same physical location or may be dispersed to multiple physical locations. The server computing device 106, ad server 108, and video server 110 can be located on the same physical device or one or more of the servers 106, 108, 110 can be distributed over many devices. The server computing device 106, ad server 108, and video server 110 can communicate via a communications network, for example communications network 104.

The client computing device 102 is the hardware that displays the interactive advertising unit containing advertising content and digital media content to a user. Example computing devices take on many forms, including but not limited to a personal computer, a standalone video player, a home video game console, a portable video game system, a personal digital assistant (PDA), an interne appliance, a smart phone, a set-top box, or the like. The computing device 102 includes network-interface components to enable the user to connect to a communications network 104, such as the Internet. The computing device 102 also includes browser software to enable the user to interact with web sites and other content providers. Some example browser software includes Microsoft® Internet Explorer, Mozilla Firefox®, or other similar software applications. The client computing device 102 also includes digital content playback plug-ins or standalone software to enable the user to view digital media content (e.g., video and audio) received over the communications network 104. Examples of digital media content playback software includes Microsoft® Windows Media® Player, Adobe® Flash® Player, QuickTime® from Apple® Computer, Inc., or other similar applications.

The server computing device 106 hosts web pages and other similar content, and receives content requests from the client computing device 102 via the communications network 104.

The communications network 104 channels communications from the client computing device 102 to the server computing device 106. The network 104 may be a local network, such as a LAN, or a wide area network, such as the Internet or the World Wide Web.

The ad server 108 hosts advertising content for use by the server computing device 106. In some embodiments, the ad server 108 receives requests for advertising content directly from the client computing device 102 via the communications network 104. In some embodiments, the ad server 108 receives requests for advertising content from the client computing device 102 by way of the server computing device 106. Advertising content can take a variety of forms. Examples include a static banner ad, a graphical animation or an interactive, rich media application that contains graphics, animation, audio, and/or video content, such as a Flash® application.

The media server 110 hosts digital media content for use by the server computing device 106. In some embodiments, the media server 110 can receive requests for digital media content from the client computing device 102 via the communications network 104. In some embodiments, the media server 110 receives requests for advertising content from the client computing device 102 by way of the server computing device 106. The digital media content can take a variety of forms. The media content can be short-form video content, i.e., a four-minute music video. The media content can be long-form video content, i.e., a thirty-minute television program. The media content can be audio content, i.e., a radio broadcast. Other examples include user-submitted amateur video, professional television shows, motion pictures, webcasts, podcasts, music videos, or other similar content.

Figure 2:
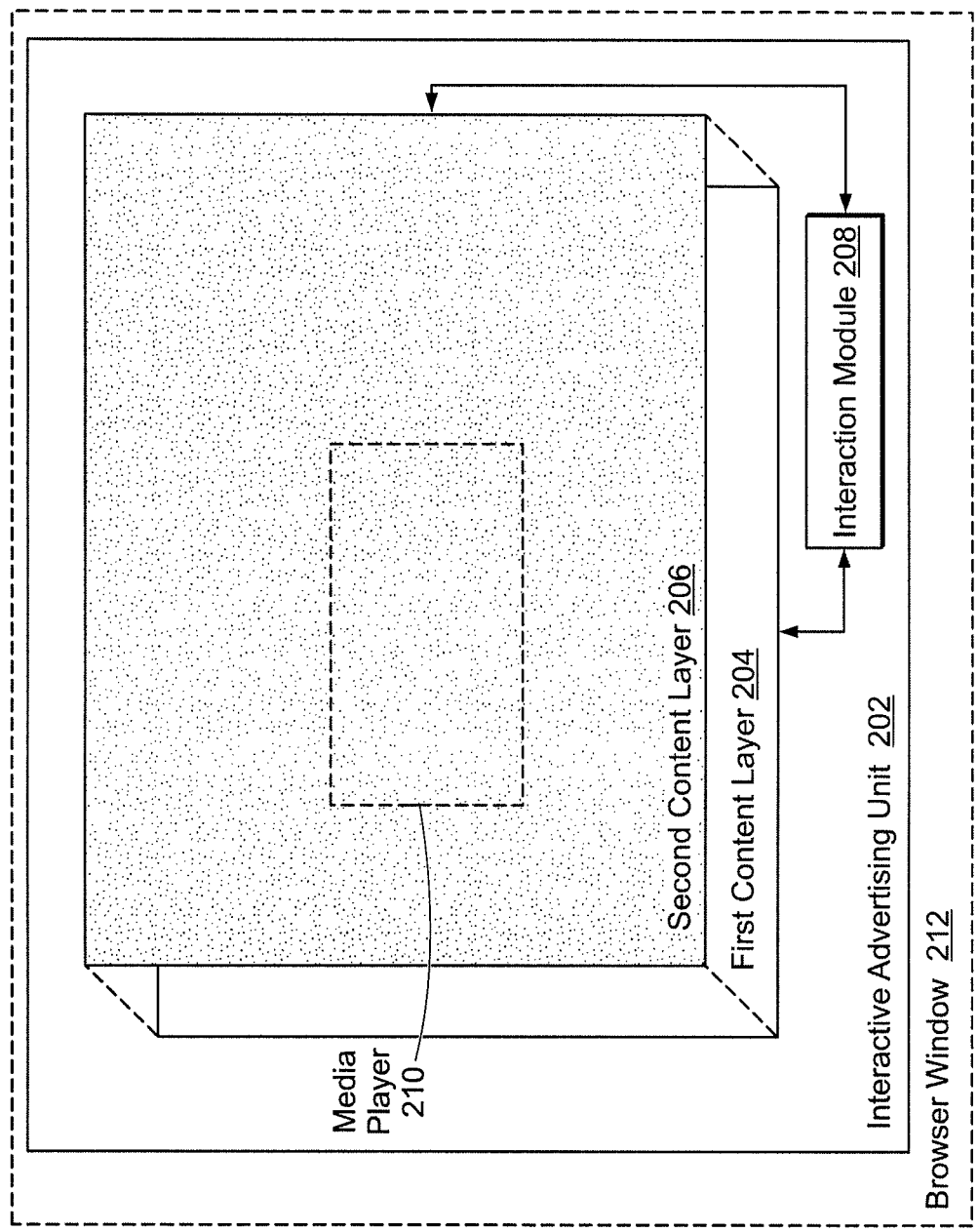
FIG. 2 is a diagram of an interactive advertising unit to display media content and advertising content.

FIG. 2 is a diagram 200 of an interactive advertising unit 202 to display media content and advertising content.

A user interacts with the system 100 by opening a web browser 212 on the client computing device 102 and entering the address of the web server 106. The client computing device 102 sends a content request associated with the address entered by the user to the server computing device 106. Once the server computing device 106 receives the request, the server computing device 106 retrieves the requested content and transmits the content for display in the web browser 212 on the computing device 102. For example, the user can enter a standard web address, such as http://www.mtv.com/videos/, into the browser window 212 at the client computing device 102. The web server 106 can then transmit the web page located at mtv.com/videos/ to the computing device 102 for display in the browser 212.

In yet other examples, the owner of the server computing device 106 may wish to present an advertisement to the user when the user requests digital media content. As above, the user interacts with the system 100 by entering or navigating to the address of media content associated with the server computing device 106. Upon receiving the request, the server computing device 106 retrieves the requested media content (e.g., from media server 110). Before transmitting the requested media content to the computing device 102, the server computing device retrieves advertising content (e.g., from the ad server 108). In some embodiments, the advertising content is selected by the server computing device 106 based on predetermined criteria, such as a focused advertising campaign. Examples of an advertising campaign can include a predetermined number of displays of the advertising content, a predefined period of time in which the advertising content will be selected for display, a marketing association between the owner of the advertising content, the producer of the requested video content, and the like. The server computing device 106 combines the advertising content and the requested digital media content to provide an interactive advertising unit 202. The server computing device 106 transmits the interactive advertising unit 202 to the client computing device 102 for presentation to a user. The interactive advertising unit 202 presents the advertising content (e.g., from ad server 108) along with the digital media content requested by the user (e.g., from media server 110) in a number of interesting, memorable, and dynamic ways, as shown below.

In some embodiments, the server computing device 106 combines the digital media content and the advertising content into an interactive advertising unit 202 using a multi-layered approach. The server computing device 106 places the digital media content and associated media player into a first content layer 204, and places the advertising content into a second content layer 206. In one embodiment, the second content layer 206 is positioned on top of the first content layer 204 of the interactive advertising unit 202. The interactive advertising unit 202 is transmitted to the client computing device 102 for display, such as in browser window 212 (e.g., embedded in a larger web page). In some embodiments, the interactive advertising unit 202 provides the second content layer 206 using the <div> tag provided by the HTML programming language, in association with Cascading Style Sheets (CSS) to coordinate presentation attributes of the <div> tag.

The interactive advertising unit 202 includes an interaction module 208 which coordinates the interactions between the content layers (e.g., first content layer 204 and second content layer 206). The interaction module 208 manages the spatial presentation, synchronizes the temporal presentation, and controls the presentation priority of the advertising content and the digital media content in the respective content layers 204 and 206. The interaction module 208 coordinates the spatial, temporal, and control functionality to work in concert with each other, advantageously merging the features of each presentation type.

Management of the spatial relationship between the digital media content and the media player in the first content layer 204, and the advertising content in the second content layer 206, is important to providing an engaging and dynamic experience to the user. In one embodiment, the interaction module 208 of the interactive advertising unit 202 positions the second content layer 206 in certain areas above the first content layer 204, thereby enabling the strategic placement of the advertising content in an area that catches the user's attention while keeping the digital media content in the first content layer 204 unobstructed and available for viewing. In another embodiment, the interaction module 208 of the interactive advertising unit 202 positions the second content layer 206 in certain areas above the first content layer 204 in a way that masks or obscures the digital media content in the first content layer 204. In this embodiment, the interaction module 208 leverages the masking of the digital media content to emphasize the advertising content or to reveal the digital media content to the user in a dramatic and unexpected way. In any of these embodiments, the second content layer 206 can be partially or fully transparent until the interactive advertising unit 202 displays the advertising content.

Synchronization of the temporal relationship between the digital media content and the media player in the first content layer 204, and the advertising content in the second content layer 206, is also important to achieving a unique and unexpected user experience. In one embodiment, the interaction module 208 displays advertising content (e.g., a pop-up ad) before presentation of the digital media content to assist the user in making a "connection" between the advertised goods and the media content, and thereby increasing the user's anticipation of and engagement in the content.

In addition, control of the presentation priority between the digital media content in the first content layer 204, and the advertising content in the second content layer 206, is important for augmenting the interactive functionality of the interactive advertising unit 202 to increase user interest in and appeal of the presented content. In one embodiment, the interaction module 208 of the interactive advertising unit 202 displays the advertising content until the module 208 receives a user input request to skip the advertising content and begin displaying the requested digital media content in the media player 210, thereby inducing the user to interact with the advertising content and maximizing exposure for the advertised goods. In another embodiment, the interaction module 208 of the interactive advertising unit 202 displays the advertising content until the content has completed its playback then transitions to displaying the requested digital media content in an unexpected way. In this embodiment, the interaction module 208 integrates the display of the advertising content seamlessly into the overall presentation to enable advertising opportunities that are dynamic and interesting.

Although shown as covering almost the entire browser window 212, the content layers 204 and 206 of the interactive advertising unit 202 can vary in size and cover any portion of the browser window 212. In some embodiments, the interactive advertising unit 202 includes multiple content layers, in addition to the first and second content layers 204 and 206. In one embodiment, the interactive advertising unit 202 places one content layer (e.g., second content layer 206) above a media player 210 contained in another content layer (e.g., first content layer 204), while the interactive advertising unit 202 can place another separate content layer (not shown) above a different section of the browser window 212, such as above the top portion or in a side margin. The interaction module 208 of the interactive advertising unit 202 coordinates the spatial presentation management, temporal presentation synchronization, and the presentation priority control of the content residing in each of the provided content layers (e.g., layers 204 and 206). In one embodiment, the interaction module 208 uses a protocol such as LocalConnections provided in the Adobe Flash® development tool to communicate between the respective content layers (e.g., layers 204 and 206).

Figure 3A:
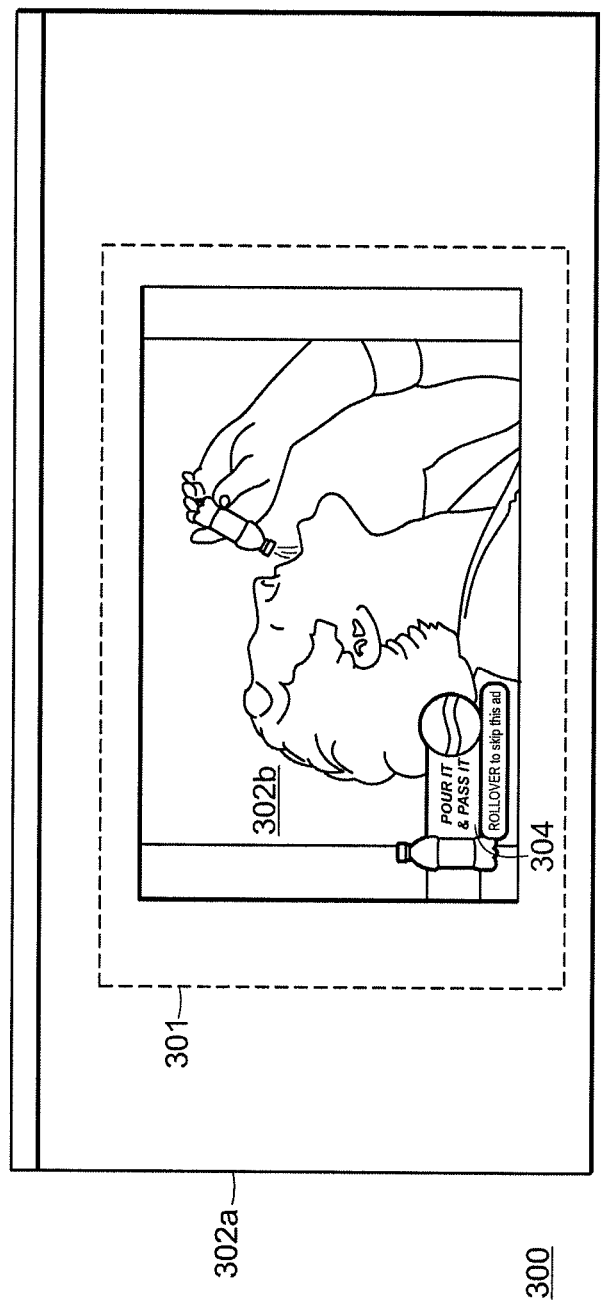
FIGS. 3A-3B are screenshots of an exemplary embodiment of an interactive advertising unit provided by the system, wherein the advertising content includes a "skip this ad" advertising button and advertising video content combined with the digital media content.
Figure 3B:
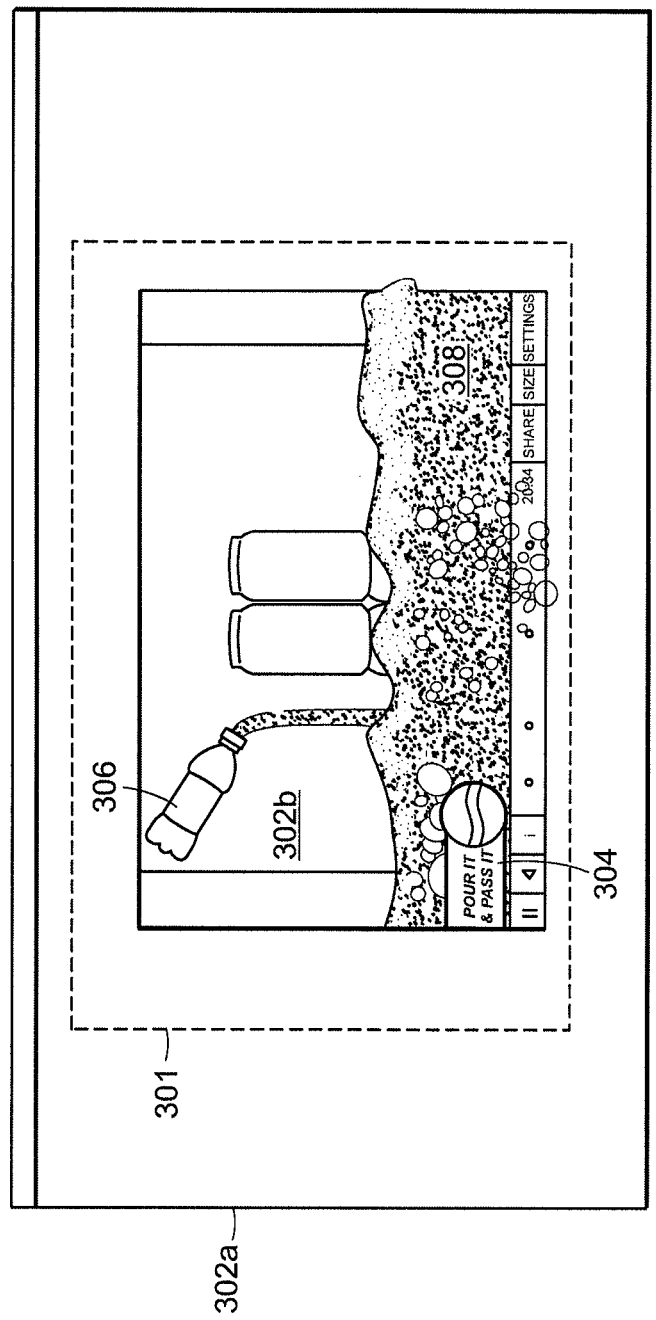

FIGS. 3A-3B are screenshots of an exemplary embodiment of an interactive advertising unit 301 provided by the system 100, wherein the advertising content includes a "skip this ad" advertising button 304 and advertising video content combined with the digital media content.

When a user at a client computing device (e.g., client computing device 102) navigates to a web page that hosts the desired digital media content, the server computing device 106 receives the request and retrieves the requested media content (e.g., from video server 110) and advertising content (e.g., from ad server 108). The server computing device 106 combines the advertising content and the digital media content to provide an interactive advertising unit 301. The interactive advertising unit 301 places the advertising content—the "skip this ad" button 304 and advertising video—into the second content layer, and places the digital media content in the first content layer which includes the media player 302b (e.g., in a browser window 302a). Unlike the typical "skip" button that stops an advertisement, the "skip this ad" button 304 allows the user to bypass the advertising video and proceed directly to displaying the requested digital media content in an interesting and interactive way.

In this embodiment, the second content layer covers the entire area of the media player 302b in the first content layer. The interactive advertising unit 301 displays the advertising video in the second content layer. The interaction module of the interactive advertising unit 301 positions the advertising video within the boundaries of the media player 302b to appear as a simulated "pre-roll" video. As the advertising video is displayed, the interaction module of the interactive advertising unit 301 controls the presentation priority of the respective content by queuing up the requested digital media content in the media player 302b and pausing it at the first frame to await either the bypass or the completion of the advertising video. Shortly after the interactive advertising unit 301 begins playback of the advertising video, the interactive advertising unit 301 displays the "skip this ad" button 304 in the second content layer to appear within the boundaries of the media player 302b (e.g., the "Pour It and Pass It" button 304 in the lower-left hand corner of FIG. 6A). The advertising video continues to play, and if the user takes no action, the advertising video would continue to completion before the interactive advertising unit 301 presents the first frame of the requested digital media content.

In this embodiment, however, the user hovers the mouse pointer over the "skip this ad" button 304 during playback of the advertising video. The interactive advertising unit 301 detects this user action and initiates a transition from the advertising video to the requested digital media content.

FIG. 3B depicts the transition in the interactive advertising unit 301 from the advertising video to the requested digital media content. When the user hovers the mouse pointer over the "skip this ad" button 304, the interactive advertising unit 301 displays a graphical animation in the second content layer (e.g., a Pepsi bottle 306 "pouring" a simulated liquid 308 into the media player 302b). In this embodiment, the animation of the simulated liquid 308, as displayed by the interactive advertising unit 301, reveals the requested digital media content as it gradually "fills up" the media player 302b. Once the simulated liquid 308 reaches the top of the media player 302b, the interaction module of the interactive advertising unit 301 makes the second content layer transparent and communicates with the media player 302b in the first content layer to begin playback of the requested digital media content. In some embodiments, the transition to the requested media content can also reveal the controls and the scrubber bar of the media player 302b, allowing the user to play/pause, rewind, change volume, etc. Other embodiments include allowing the user to drag the mouse pointer back and forth in the second content layer 302c to "erase" the advertising content or "uncover" the requested digital media content in the media player 302b. The interaction module and interactive advertising unit 301 achieve this transition using any combination of known masking techniques that are coordinated with the movement of the icon 306 to make the second content layer appear transparent with that movement.

Figure 4A:
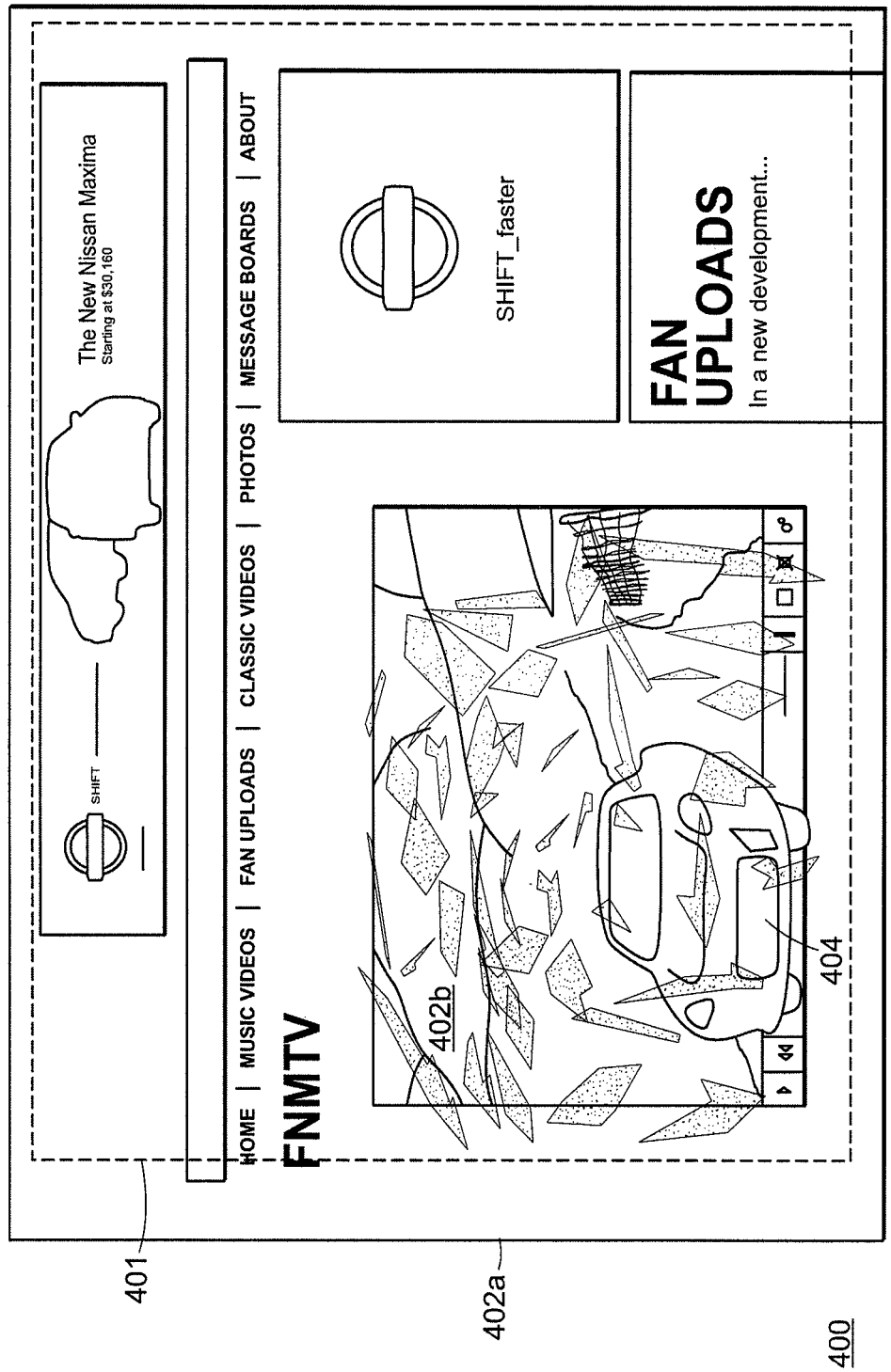
FIGS. 4A-4B are screenshots of an exemplary embodiment of an interactive advertising unit provided by the system, wherein the advertising content includes an animated advertisement combined with the digital media content.
Figure 4B:
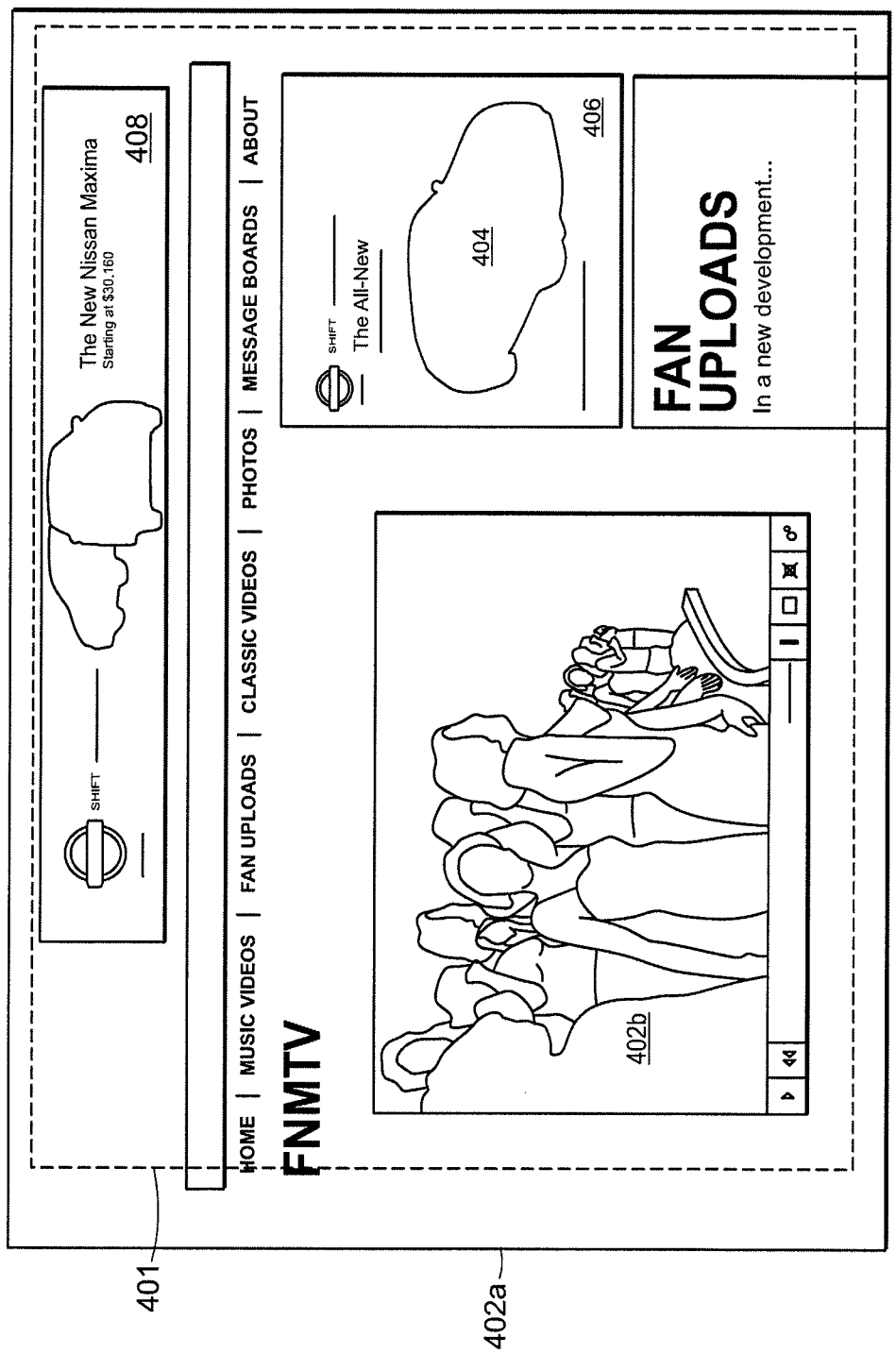

FIGS. 4A-4B are screenshots of an exemplary embodiment of an interactive advertising unit 401 provided by the system 100, wherein the advertising content includes an animated advertisement combined with the digital media content.

As shown in FIG. 4A, when a user at the client computing device (e.g., client computing device 102) navigates to a server computing device (e.g., server computing device 106) that hosts the desired digital media content, the server computing device 106 retrieves the requested video content (e.g., from video server 110) and advertising content (from ad server 108). The server computing device 106 combines the advertising content and the digital media content to provide an interactive advertising unit 401. The interactive advertising unit 401 includes a second content layer, and places the advertising content—the animated advertisement—into the second content layer. The interactive advertising unit also includes a first content layer which includes the requested digital media content and a media player 402b.

In this embodiment, the interaction module of the interactive advertising unit 401 positions the animated advertisement within the boundaries of the media player 402b to appear as a simulated "pre-roll" video. As the animated advertisement is displayed, the interaction module of the interactive advertising unit 401 controls the presentation priority of the respective content by queuing up the requested digital media content in the media player 402b and pausing it at the first frame to await either the bypass or the completion of the animated advertisement. As the interactive advertising unit 401 presents the animated advertisement, the advertisement displays a graphical animation of the advertised product 404 (e.g., a Nissan automobile "breaking through" the window of the media player 402b) is displayed in the second content layer. The interactive advertising unit 401 uses the animated advertisement to provide the illusion that the advertised product is "escaping" from the media player 402b and moving around the display area.

FIG. 4B depicts the transition from the advertising content to the requested digital media content. After the interactive advertising unit 401 displays the animated product 404 in the second content layer, the interaction module of the interactive advertising unit 401 manages the spatial presentation of the advertisement by moving the animated product 404 around the browser window 402a until the product 404 stops, for example, on an advertisement banner 406 located in another area of the second content layer. The interaction module of the interactive advertising unit 401 makes the remaining portion of the second content layer transparent, and instructs the media player 402b in the first content layer to display the requested media content. The interactive advertising unit still displays one or more static banner advertisements which are associated with the animated product and/or the animated advertisement.

The above-described systems and methods can be implemented in digital electronic circuitry, in computer hardware, firmware, and/or software. The implementation can be as a computer program product (i.e., a computer program tangibly embodied in a computer readable medium). The implementation can, for example, be in a machine-readable storage device and/or include a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array), an ASIC (application-specific integrated circuit), a DSP (digital signal processor), and/or any other discrete circuitry that is configured to implement the required functions. Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Computer readable mediums suitable for embodying computer program instructions and data include all forms of non-volatile memory, including by way of example semiconductor memory devices. The computer readable mediums can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device or a transmitting device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The client device and the computing device can include, for example, a computer, a computer with a browser device, a telephone, an IP phone, a mobile device (e.g., cellular phone, personal digital assistant (PDA) device, smart phone, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry®.

The web servers can be, for example, a computer with a server module (e.g., Microsoft® Internet Information Services available from Microsoft Corporation, Apache Web Server available from Apache Software Foundation, Apache Tomcat Web Server available from Apache Software Foundation).

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

The above described communication networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

The invention claimed is:

1. A method for dynamic integration and linear presentation of advertising content and media content, the method comprising:

receiving, by a server computing device, a request for media content from a remote computing device;

combining, by the server computing device, the requested media content and advertising content to provide an interactive advertising unit, wherein the interactive advertising unit comprises:

a first content layer including the requested media content and a media player;

a second content layer including the advertising content; and an integration module for coordinating interaction between the first and second content layers, wherein the coordinating includes one or more of:

managing the spatial presentation of the requested media content and the advertising content including positioning the advertising content to cover at least a portion of a display window of the media player;

synchronizing the temporal presentation of the requested media content and the advertising content including displaying a visual transition from the advertising content to the media content in response to user input before playback of the advertising content is finished, wherein the visual transition includes a graphical representation of an advertised product; and controlling the presentation priority of the requested media content and the advertising content; and transmitting, by the server computing device, the interactive advertising unit for presentation on the remote computing device, wherein the advertising content is presented before the requested media content.

2. The method of claim 1, wherein the requested media content is displayed in the media player of the interactive advertising unit.

3. The method of claim 1, wherein managing the spatial presentation includes positioning the advertising content over the media player so as to obscure the requested media content.

4. The method of claim 1, wherein managing the spatial presentation includes positioning the advertising content in proximity to the media player so as to display the requested media content unobscured.

5. The method of claim 1, wherein controlling the presentation priority includes instructing the media player to stop displaying the advertising content and to start displaying the requested media content.

6. The method of claim 1, wherein the advertising content includes a content transition application and managing the spatial presentation includes positioning the content transition application to cover at least the display window of the media player, wherein interaction with the content transition application instructs the interactive advertising unit to transition from displaying the advertising content to displaying the requested media content.

7. The method of claim 6, wherein the visual transition includes revealing, by the interactive advertising unit, the requested media content.

8. The method of claim 7, wherein revealing occurs over a period of time.

9. The method of claim 7, wherein portions of the advertising content and the requested media content are displayed simultaneously during the revealing step.

10. The method of claim 6, wherein the content transition application displays a graphical representation of an advertised product, an advertised service, or both.

11. The method of claim 1, wherein the advertising content includes an animated application and managing the spatial presentation includes positioning the animated application to cover at least the display window of the media player, wherein the interactive advertising unit displays the animated application before displaying the requested media content.

12. The method of claim 10, wherein the animated application displays a graphical representation of an advertised product, an advertised service, or both.

13. The method of claim 1, wherein the integration module is configured to transmit one or more commands from the second content layer to the first content layer, the one or more commands operable to control playback of the requested media content in the media player.

14. A system for dynamic integration and linear presentation of advertising content and media content, the system comprising:
a server computing device configured to:
receive a request for media content from a remote computing device;
combine the requested media content and advertising content to provide an interactive advertising unit, wherein the interactive advertising unit comprises:
a first content layer including the requested media content and a media player;
a second content layer including the advertising content; and
an integration module for coordinating interaction between the first and second content layers, wherein the coordinating includes one or more of:
managing the spatial presentation of the requested media content and the advertising content including positioning the advertising content to cover at least a portion of a display window of the media player;
synchronizing the temporal presentation of the requested media content and the advertising content including displaying a visual transition from the advertising content to the media content in response to user input before playback of the advertising content is finished, wherein the visual transition includes a graphical representation of an advertised product; and
controlling the presentation priority of the requested media content and the advertising content; and
transmit the interactive advertising unit for presentation on the remote computing device, wherein the advertising content is presented before the requested media content.

15. A computer program product, tangibly embodied in a non-transitory computer readable storage medium, dynamic integration and linear presentation of advertising content and media content, the computer program product including instructions operable to configure a data processing apparatus to:
receive a request for media content from a remote computing device;
combine the requested media content and advertising content to provide an interactive advertising unit, wherein the interactive advertising unit comprises:
a first content layer including the requested media content and a media player;
a second content layer including the advertising content; and
an integration module for coordinating interaction between the first and second content layers, wherein the coordinating includes one or more of:
managing the spatial presentation of the requested media content and the advertising content including positioning the advertising content to cover at least a portion of a display window of the media player;
synchronizing the temporal presentation of the requested media content and the advertising content including displaying a visual transition from the advertising content to the media content in response to user input before playback of the advertising content is finished, wherein the visual transition includes a graphical representation of an advertised product; and
controlling the presentation priority of the requested media content and the advertising content; and
transmit the interactive advertising unit for presentation on the remote computing device, wherein the advertising content is presented before the requested media content.

* * * * *